Jan. 2, 1934.  J. FAULDS  1,941,792
BAKE OVEN
Filed May 22, 1933   3 Sheets-Sheet 1

Inventor:
John Faulds
By Gilson, Mann & Co. Attys.

Jan. 2, 1934.　　　　J. FAULDS　　　　1,941,792
BAKE OVEN
Filed May 22, 1933　　　3 Sheets-Sheet 2
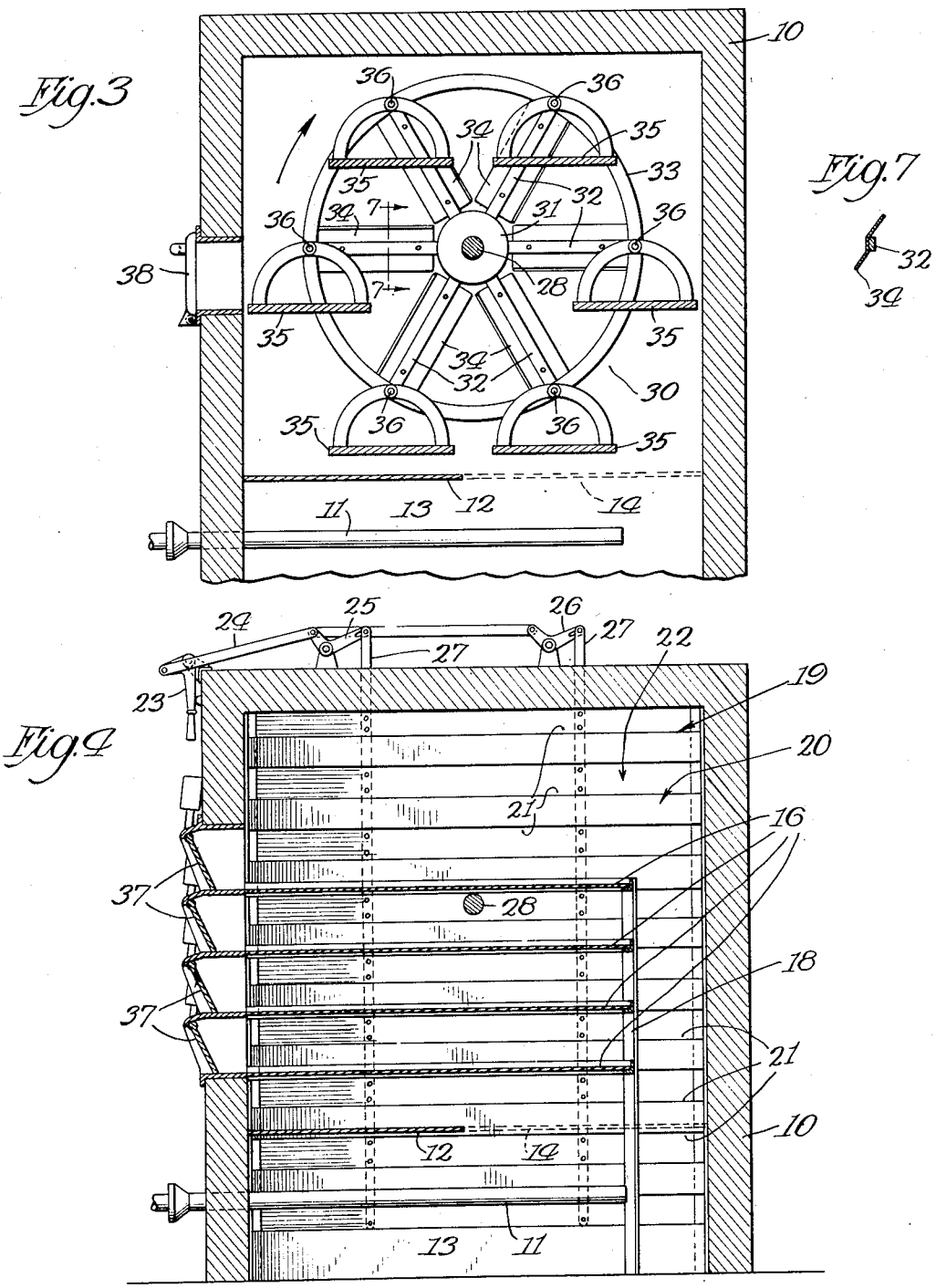

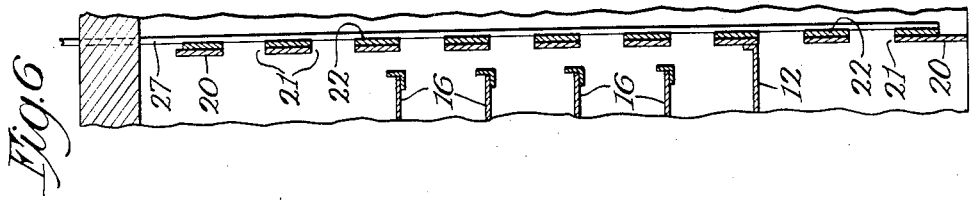
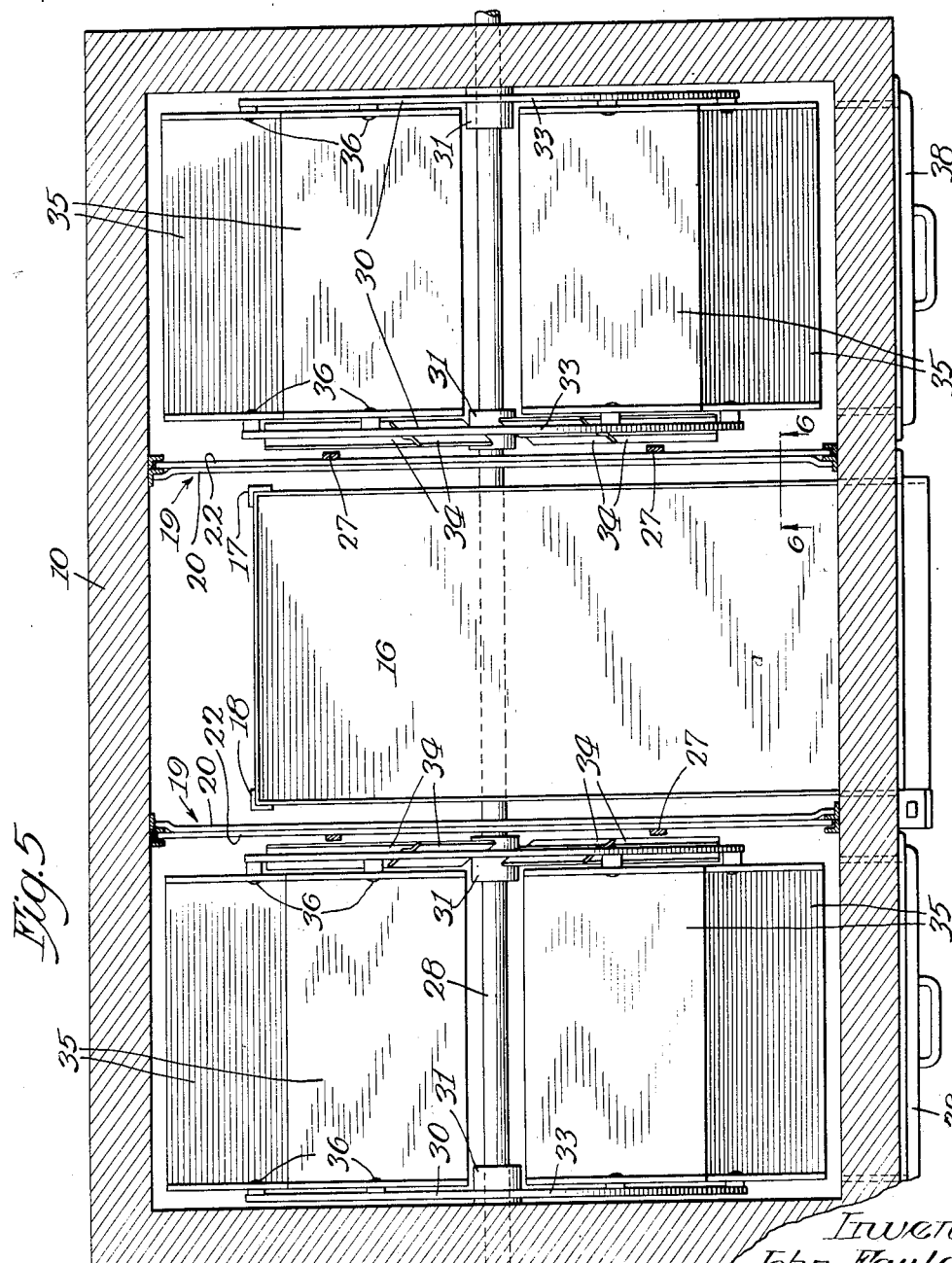

Patented Jan. 2, 1934

1,941,792

UNITED STATES PATENT OFFICE 1,941,792

BAKE OVEN

John Faulds, Oak Park, Ill.

Application May 22, 1933. Serial No. 672,181

3 Claims. (Cl. 107—59)

The object of the present invention is to provide, in a single structure, stationary baking shelves and movable shelves, the several sections of the chamber being separated by means of openable partitions, thereby providing for the separate or conjoint use of the different sets of shelving.

One embodiment of the invention is hereinafter described, and is illustrated in the accompanying drawings, in which Fig. 1 is a front elevation of the oven;

Fig. 2 is a vertical transverse section thereof;

Figs. 3 and 4 are sectional views, respectively, on the lines 3—3 and 4—4 of Fig. 1;

Fig. 5 is a plan section on the line 5—5 of Fig. 1;

Fig. 6 is a sectional detail on the line 6—6 of Fig. 5; and

Fig. 7 is a detail section on the line 7—7 of Fig. 3.

Figure 1:
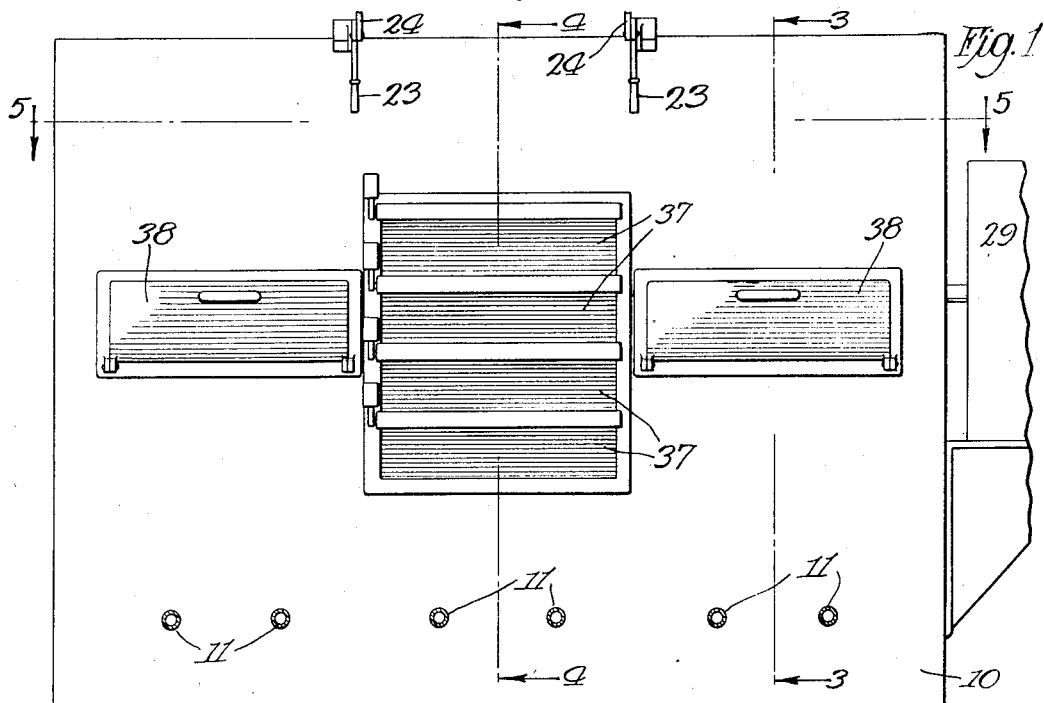

The casing 10 of the oven is of ordinary construction, and is of suitable shape to provide the baking compartments as hereinafter described. Some form of heating device is located within the lower part of the casing. As shown, a set of gas pipes 11 is indicated.

When gas is used the vapors of combustion may be permitted to pass through the baking chamber. Preferably a portion of the space over the burners is closed by a partition, as 12. When a fuel, such as coal, is used, the vapors from which would be injurious to the foods to be baked, the fire-box 13 should be entirely separated from the baking chamber, as by extending the partition 12 as indicated at 14 by dotted lines, and a smoke flue should be provided.

The central portion of the baking chamber is occupied by a vertical series of stationary shelves 16, as many in number as may be desired, these shelves being supported on suitable framing, such as the uprights 17, 18.

The central section of the oven chamber is flanked by partitions, generally designated by the numeral 19. Each of these partitions is composed of a plate 20, having louvre openings 21. Suitable means is provided for closing these openings when it is desired to use only the central baking chamber or the end chambers, or either of them. For this purpose there is provided a vertically movable plate 22, having openings and solid portions both of the same width as the louvre openings 21. Vertical movement of the plate 22 will open or close the louvre openings.

The plate 22 is controlled by any suitable raising and lowering mechanism. For this purpose there is shown a bell-crank hand lever 23, pivoted on a suitable bracket attached to the front of the oven and connected by means of a rod 24 with a pair of bell-cranks 25, 26, pivotally mounted on top of the oven and connected to links 27 which extend upwardly from the partition 22 through the top wall of the oven.

Figure 2:
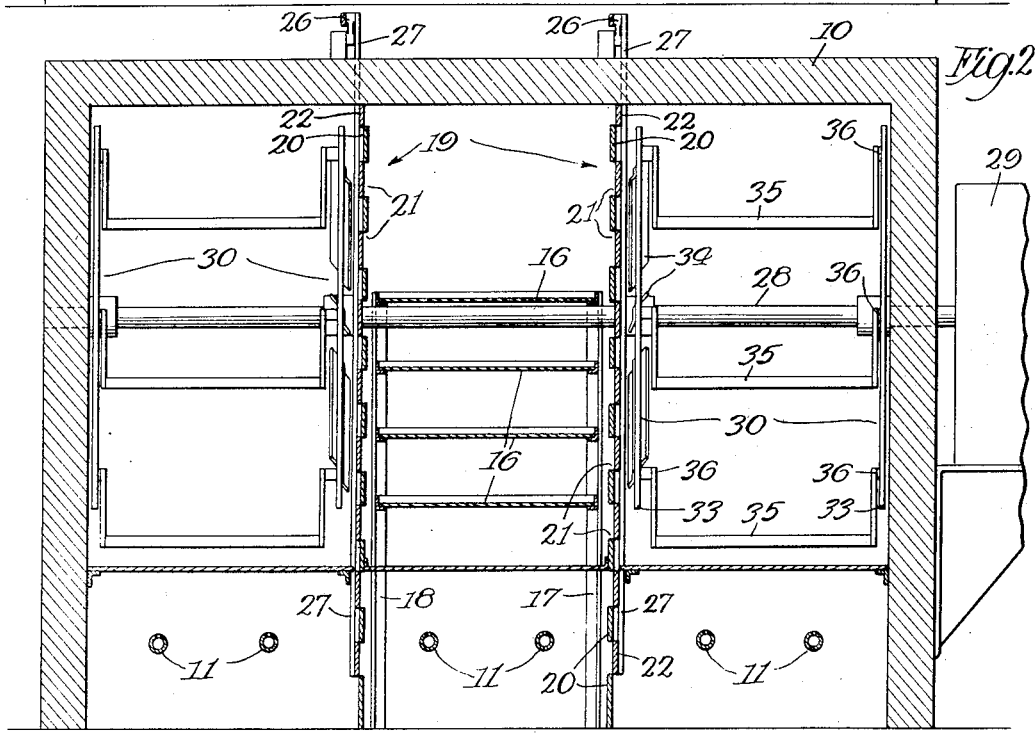

Preferably, though not necessarily, the partitions 20 and movable plates 22 extend entirely to the bottom of the oven, crossing the furnace chamber, as plainly shown in Fig. 2. A shaft 28 extends horizontally through the oven, and may be turned by any suitable power device applied to one of its projecting ends, a motor 29 being conventionally indicated as applied to the shaft and resting upon a suitable bracket attached to the outer surface of one of the oven walls.

Mounted upon this shaft are a pair of reels 30, one in each of the end chambers of the oven. Each of these reels may be described as comprising a pair of wheels, each having a hub 31, spokes 32, and a rim 33. Preferably the wheel adjacent the partition 20 is provided with fan blades 34 attached to its spokes for the purpose of causing an agitation and promoting a circulation of the air within the bake chambers, and particularly urging it through the louvre openings 21. Each of the reels carries a number of bake shelves 35, pivotally attached, as indicated at 36, to the rims 33, these shelves continuously maintaining a horizontal position as the reels rotate. Doors, as 37, 38, in the oven front give access to the several baking chambers.

As thus organized the several compartments of the oven may be simultaneously or separately used. When the central section only is in use the reels are, of course, not turned, and the portions of the furnace immediately below the end compartments need not be used. Similarly, when the end compartments are used the section of the furnace immediately below the central compartment may be out of use. When all of the oven sections are in service heat may be applied directly to each of them, or only to the end sections. In either case the heat is uniformly distributed through the several chambers not only by the natural movement of hot vapors, but this movement is stimulated by the agitation due to the turning of the reels.

While the construction disclosed is operative and practical, the invention may be differently embodied without departing from its scope.

I claim as my invention—

1. A bake oven comprising a casing, a set of stationary shelves occupying a central section of the chamber of the casing, two sets of vertically movable shelves within the chamber and located in sections of the chamber on opposite sides of the stationary shelves, the adjacent sections of the chamber being separated by openable partitions, and means for actuating the movable shelves.

2. A bake oven comprising a casing, a vertical series of stationary shelves occupying the central portion of the chamber, shelf-carrying reels located on opposite sides of the stationary shelves, an apertured partition adjacent each side of the last-named shelves, means for opening and closing the spaces of such partitions, a reel-carrying shaft journaled across the chamber, means for turning the shaft, and means for heating the end sections of the chamber.

3. A bake oven comprising a casing, a set of stationary shelves occupying the central section of the chamber of the casing, shelf-carrying reels in the end sections of the casing chamber, the several named sections being in communication, means for heating the end casing sections, means for actuating the reels, and fan blades carried by the reels for agitating the air in the chamber.

JOHN FAULDS.